United States Patent
Zhang et al.

(10) Patent No.: US 10,169,141 B2
(45) Date of Patent: Jan. 1, 2019

(54) MODIFIABLE STRIPE LENGTH IN FLASH MEMORY DEVICES

(71) Applicant: SK Hynix Inc., Gyeonggi-do (KR)

(72) Inventors: Fan Zhang, Fremont, CA (US); Chenrong Xiong, San Jose, CA (US); Yu Cai, San Jose, CA (US); Aman Bhatia, San Jose, CA (US); HyungSeok Kim, Santa Clara, CA (US); June Lee, Sunnyvale, CA (US)

(73) Assignee: SK Hynix Inc., Gyeonggi-do (KR)

( * ) Notice: Subject to any disclaimer, the term of this patent is extended or adjusted under 35 U.S.C. 154(b) by 92 days.

(21) Appl. No.: 15/473,237

(22) Filed: Mar. 29, 2017

(65) Prior Publication Data
US 2018/0046538 A1 Feb. 15, 2018

Related U.S. Application Data

(60) Provisional application No. 62/373,784, filed on Aug. 11, 2016.

(51) Int. Cl.
G06F 11/10 (2006.01)
G06F 3/06 (2006.01)

(52) U.S. Cl.
CPC ........ G06F 11/1048 (2013.01); G06F 3/0604 (2013.01); G06F 3/0631 (2013.01); G06F 3/0644 (2013.01); G06F 3/0683 (2013.01); G06F 11/102 (2013.01)

(58) Field of Classification Search
CPC .......................... G06F 11/1048; G06F 11/102
See application file for complete search history.

(56) References Cited

U.S. PATENT DOCUMENTS 6,055,354 A * 4/2000 Bopardikar ........... G06F 3/0601
 386/329
6,484,235 B1 * 11/2002 Horst ...................... G06F 3/061
 711/114
6,487,633 B1 * 11/2002 Horst ...................... G06F 3/061
 711/112

(Continued)

OTHER PUBLICATIONS

Kang et al., "Adding Aggressive Error Correction to a High-Performance Compressing Flash File System", Proc. of the 9th ACM & IEEE Int. Conf. on Embedded Software, Oct. 12-16, 2009, Grenoble, France, 9 pages.

*Primary Examiner* — Joseph D Torres
(74) *Attorney, Agent, or Firm* — Kilpatrick Townsend & Stockton LLP

(57) ABSTRACT

A memory device including a memory having a plurality of memory cells for storing data. The memory device includes a controller communicatively coupled to the memory and configured to organize the data as a plurality of stripes. Each individual stripe of the plurality of stripes includes a plurality of data groups, each of the plurality of data groups stored in the memory using a subset of the plurality of memory cells. Stripe lengths (number of data groups) for individual stripes are determined by the controller based on detecting a condition associated with one or more data groups of the plurality of data groups. At least one data group of the plurality of data groups for each of the individual stripes includes parity data for correcting bit errors associated with the subset of the plurality of memory cells for the individual stripe.

20 Claims, 9 Drawing Sheets

(56) References Cited

U.S. PATENT DOCUMENTS

| | | |
|---|---|---|
| 8,176,284 B2 | 5/2012 | Frost et al. |
| 9,128,871 B2 | 9/2015 | Frost et al. |
| 9,208,018 B1 | 12/2015 | Northcott et al. |
| 2004/0015655 A1* | 1/2004 | Willis .................. G06F 3/0607 711/114 |

* cited by examiner

| Data Group $D_{1-1}$ | $BER_{1-1}$ |
|---|---|
| Data Group $D_{1-2}$ | $BER_{1-2}$ |
| ⋮ | |
| Data Group $D_{1-N_1}$ | $BER_{1-N_1}$ |
| Parity Group $P_1$ | $BER_{P_1}$ |
| Data Group $D_{2-1}$ | $BER_{2-1}$ |
| Data Group $D_{2-2}$ | $BER_{2-2}$ |
| ⋮ | |
| Data Group $D_{2-N_2}$ | $BER_{2-N_2}$ |
| Parity Group $P_2$ | $BER_{P_2}$ |
| Data Group $D_{3-1}$ | $BER_{3-1}$ |
| Data Group $D_{3-2}$ | $BER_{3-2}$ |
| ⋮ | |
| Data Group $D_{3-N_3}$ | $BER_{3-N_3}$ |
| Parity Group $P_3$ | $BER_{P_3}$ |
| Data Group $D_{4-1}$ | $BER_{4-1}$ |
| Data Group $D_{4-2}$ | $BER_{4-2}$ |
| ⋮ | |
| Data Group $D_{4-N_4}$ | $BER_{4-N_4}$ |
| Parity Group $P_4$ | $BER_{P_4}$ |

Stripe $S_1$
Stripe Length $L_1 = N_1+1$

Stripe $S_2$
Stripe Length $L_2 = N_2+1$

Stripe $S_3$
Stripe Length $L_3 = N_3+1$

Stripe $S_4$
Stripe Length $L_4 = N_4+1$

MODIFIABLE STRIPE LENGTH IN FLASH MEMORY DEVICES

CROSS-REFERENCES TO RELATED APPLICATIONS

The present application claims priority to U.S. Provisional Application No. 62/373,784, entitled "CHIPKILL FOR DIFFERENT WORDLINE GROUPS AND PAGES," filed Aug. 11, 2016, which is commonly assigned and expressly incorporated by reference herein in its entirety for all purposes.

FIELD

The present invention relates generally to systems, methods, and apparatus for storage devices, and specifically to improving performance of non-volatile memory devices

BACKGROUND

Non-volatile memory devices such as Solid State Drives (SSDs) are finding new applications in consumer electronics. For example, they are replacing Hard Disk Drives (HDDs), which typically comprise rapidly rotating disks (platters). Non-volatile memories, sometimes referred to as 'flash memories' (for example, NAND and NOR flash devices), are used in media storage, cameras, mobile phones, mobile computers, laptop computers, USB flash drives, etc. Non-volatile memory provides a relatively reliable, compact, cost-effective, and easily accessible method of storing data when the power is off.

Flash memory controllers are used to manage the data stored in the non-volatile memory, and to act as an interface between a host and the non-volatile memory. The uncorrectable bit-error-rate (UBER) of a memory device is of great interest to circuit designers and manufacturers, and may be influenced by flash memory controllers. There is a need for new systems, methods, and techniques for decreasing the UBER of memory devices.

SUMMARY

Techniques are disclosed for storing data in a memory. Some embodiments of the present disclosure include a memory device including a memory having a plurality of memory cells for storing data. The memory device may include a controller communicatively coupled to the memory and configured to organize the data as a plurality of stripes. In some embodiments, each individual stripe of the plurality of stripes includes a plurality of data groups, each of the plurality of data groups stored in the memory using a subset of the plurality of memory cells. In some embodiments, a stripe length for the individual stripe is determined by the controller based on detecting a condition associated with one or more data groups of the plurality of data groups. In some embodiments, the stripe length for the individual stripe is a number of the plurality of data groups included in the individual stripe. In some embodiments, at least one data group of the plurality of data groups for each of the individual stripes includes parity data for correcting bit errors associated with the subset of the plurality of memory cells for the individual stripe.

In some embodiments, the controller is further configured to determine a change in the condition and modify the stripe length for the individual stripe based on the change in the condition. In some embodiments, a first stripe of the plurality of stripes has a first stripe length and a second stripe of the plurality of stripes has a second stripe length. In some embodiments, the first stripe length and the second stripe length are different. In some embodiments, the condition is a first condition and the memory device is further configured to determine the stripe length for the individual stripe based on a second condition. In some embodiments, the condition is a first condition and the memory device is further configured to modify the stripe length for the individual stripe based on a second condition. In some embodiments, the condition is a bit error rate (BER) for the one or more data groups of the individual stripe. In some embodiments, the stripe length for the individual stripe is determined such that the BER for the one or more data groups of the individual group is less than a threshold.

In some embodiments, a plurality of BERs is determined including the BER for the one or more data groups of each of the plurality of stripes. In some embodiments, the stripe length for each of the plurality of stripes is determined such that each of the plurality of BERs are within a threshold distance of each other. In some embodiments, the controller is further configured to determine the BER for the one or more data groups of the individual stripe. In some embodiments, the condition is a placement of the memory cells associated with the one or more data groups of the individual stripe within the memory. In some embodiments, the condition is a number of program erase cycles (PEC) for the one or more data groups of the individual stripe.

Some embodiments of the present disclosure include a method for storing data in a memory comprising a plurality of memory cells. The method may include organizing the data as a plurality of stripes, where each individual stripe of the plurality of stripes comprises a plurality of data groups and each of the plurality of data groups stored in the memory usies a subset of the plurality of memory cells. The method may also include detecting a condition associated with one or more data groups of the plurality of data groups. The method may further include determining a stripe length for the individual stripe based on detecting the condition, where the stripe length is a number of the plurality of data groups included in the individual stripe. In some embodiments, at least one data group of the plurality of data groups for each of the individual stripes includes parity data for correcting bit errors associated with the subset of the plurality of memory cells for the individual stripe.

Some embodiments of the present disclosure include a controller communicatively coupled to a memory comprising a plurality of memory cells for storing data. The controller may be configured to perform operations including one or more steps of the method described herein.

BRIEF DESCRIPTION OF THE DRAWINGS

The accompanying drawings, which are included to provide a further understanding of the invention, are incorporated in and constitute a part of this specification, illustrate embodiments of the invention and together with the detailed description serve to explain the principles of the invention. No attempt is made to show structural details of the invention in more detail than may be necessary for a fundamental understanding of the invention and various ways in which it may be practiced.

FIG. 5 shows a representation of a plurality of stripes, according to some embodiments of the present disclosure.

Figure 1:
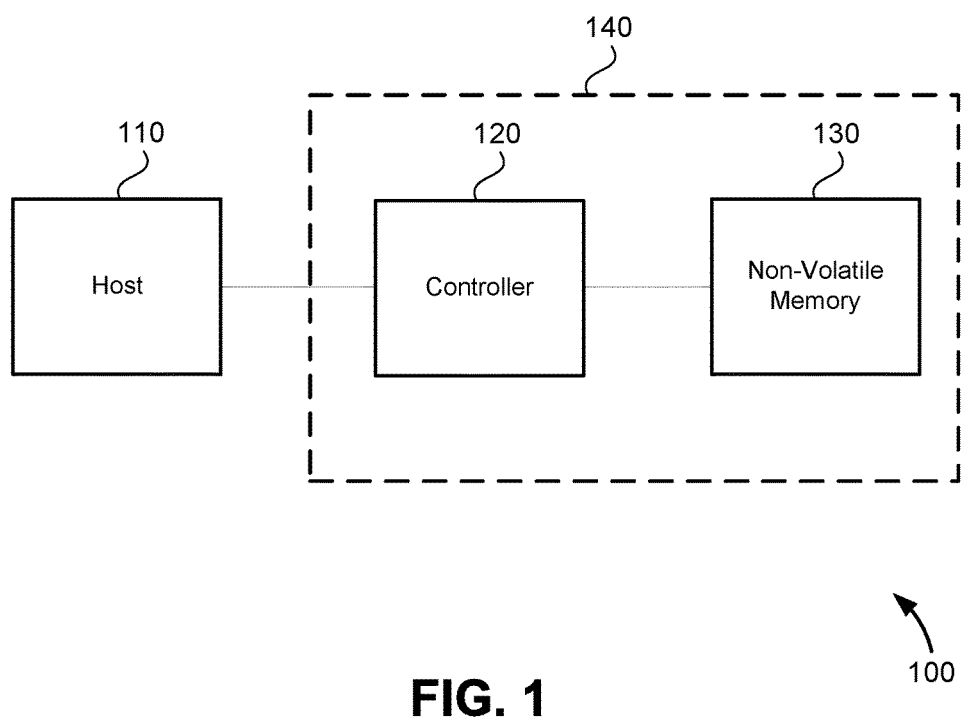
FIG. 1 shows a block diagram illustrating a system including a host, a controller, and a non-volatile memory, according to some embodiments of the present disclosure.

In the appended figures, similar components and/or features may have the same numerical reference label. Further, various components of the same type may be distinguished by following the reference label with a letter or by following the reference label with a dash followed by a second numerical reference label that distinguishes among the similar components and/or features. If only the first numerical reference label is used in the specification, the description is applicable to any one of the similar components and/or features having the same first numerical reference label irrespective of the suffix.

DETAILED DESCRIPTION

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments. However, it will be apparent that various embodiments may be practiced without these specific details. The figures and description are not intended to be restrictive.

The ensuing description provides examples, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

The following detailed description together with the accompanying drawings in which the same reference numerals are sometimes used in multiple figures to designate similar or identical structures structural elements, provide a better understanding of the nature and advantages of the present invention.

Provided herein are embodiments for improving non-volatile memory devices by organizing the data that is stored in memory cells in a plurality of stripes. Each of the stripes includes various data groups, and one of which may include parity data for correcting bit errors associated with the memory cells corresponding to the other data groups in the stripe. The size (i.e., length) and content of the stripes may be determined based on a condition of the various data groups within the stripes, such as a bit-error rate (BER). Embodiments described herein for determining stripe lengths improve performance of non-volatile memory devices in several ways. For example, techniques described herein decrease the uncorrectable bit-error-rate (UBER) of the memory devices, which is of great interest to circuit designers and manufacturers. Furthermore, by determining/modifying stripe lengths based on a condition such as the BER of the stripe, the amount of data that is used as parity data may be saved/minimized. As a stripe length is later modified in response to changes in the BER of the stripe, the amount of parity data may further be refined to reflect the amount of degradation of the underlying components. For example, as the dielectric material associated with a particular transistor begins to deteriorate over time, the stripe length associated with that transistor may decrease to compensate for the loss in performance of the transistor. As another example, in situations where components are performing better (e.g., lower BER) than was initially estimated, the stripe length associated with the components may be increased to reduce the parity data and increase the number of information containing bits.

FIG. 1 shows a simplified block diagram illustrating a system 100 including a host 110, a controller 120, and a non-volatile memory 130, according to some embodiments of the present disclosure. In some embodiments, controller 120 may be a processor, such as a RISC or CISC architecture processors, or another type of processor. Controller 120 may also include memory (e.g., volatile memory) (not shown) separate from non-volatile memory 130 for storing and executing firmware to manage the communication between host 110 and non-volatile memory 130. In some embodiments, non-volatile memory 130 can be a NAND flash memory. In other embodiments, non-volatile memory 130 can be a NOR flash memory configured to interact externally as a NAND flash memory. In some embodiments, non-volatile memory 130 can be designed to store data in the absence of a continuous or substantially continuous external power supply. In some examples, non-volatile memory 130 can be used for secondary data storage, for example, in a computer system such as a laptop. In such examples, a non-volatile memory system 140 can replace a hard disk drive (HDD). In some examples, controller 120 can be external to non-volatile memory system 140. In some such examples, controller 120 can interact with a plurality of non-volatile memories. Examples of the non-volatile memory can include read only memory (ROM), a mask ROM (MROM), a programmable ROM (PROM), an erasable programmable ROM (EPROM), an electrically erasable programmable ROM (EEPROM), Ferroelectric RAM (F-RAM), Magnetoresistive RAM (RAM), polymer-based organic memory, holographic memory, phase change memory and the like.

Host 110 can include any appropriate hardware device, software application, or a combination of hardware and software. In some embodiments, host 110 can include a host-side controller (not shown). In some embodiments, controller 120 can interface between host 110 and non-volatile memory 130. Controller 120 can be configured to receive various commands from host 110 and interface with non-volatile memory 130 based on these commands.

Figure 2:
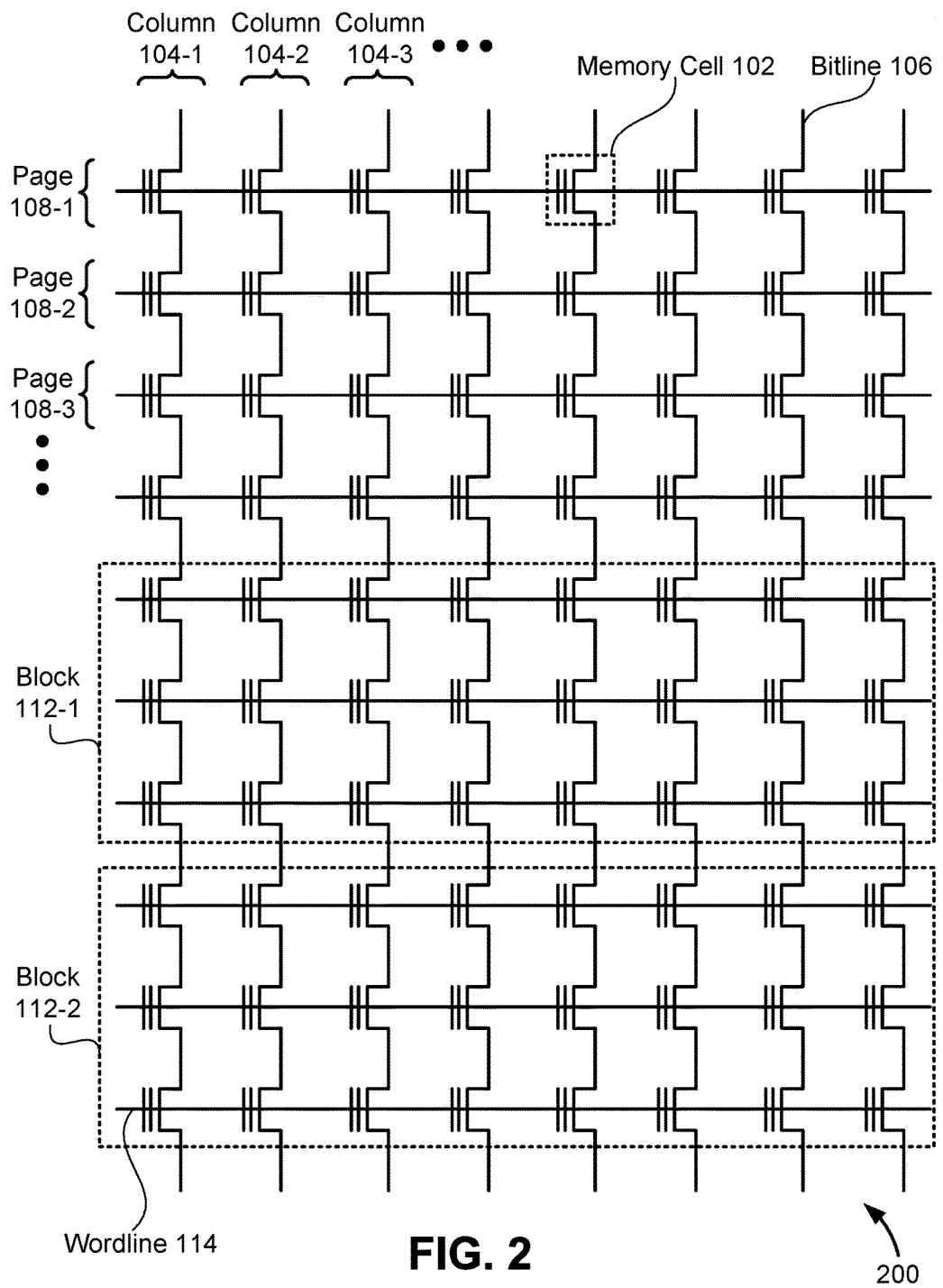
FIG. 2 shows a simplified illustration of a non-volatile memory, according to some embodiments of the present disclosure.

FIG. 2 shows a simplified illustration of a non-volatile memory 200, according to some embodiments of the present disclosure. It should be noted that the structure shown in FIG. 2 is for illustrative purposes only and the actual physical organization of the non-volatile memory 200 can differ substantially from the depiction. In the example shown in FIG. 2, non-volatile memory 200 comprises a plurality of memory cells 102 for storing data. Memory cells 102 may be floating-gate transistors such as floating-gate MOSFETs. Memory cells 102 may be grouped and/or referenced using a wide range of configurations, including columns 104, bitlines 106, pages 108, blocks 112, and wordlines 114. Other groupings of memory cells 102 are also anticipated, including groupings across different chips, dies, planes, among others. In some embodiments, pages 108 can represent a minimum programmable unit and a minimum readable unit.

One or more components of non-volatile memory 200 may fail prior to or during operation of non-volatile memory system 140. Causes of a failure may be due to defects during the manufacturing process, mechanical stress to the device prior to or during use, degradation of the dielectric material in memory cells 102, among others. Failures may occur at the memory cell level, which may propagate and cause failures within other components of non-volatile memory 200. In some embodiments, a group of memory cells 102 may be considered to fail when no data from any one of the memory cells in the group is writable and/or readable. In some embodiments, a group may be considered to fail when at least one of the memory cells in the group is neither writable and/or readable. In such instances, an error-correcting code (ECC) scheme, such as one or more parity bits, might be used to recover the data in the failed group.

Figure 3:
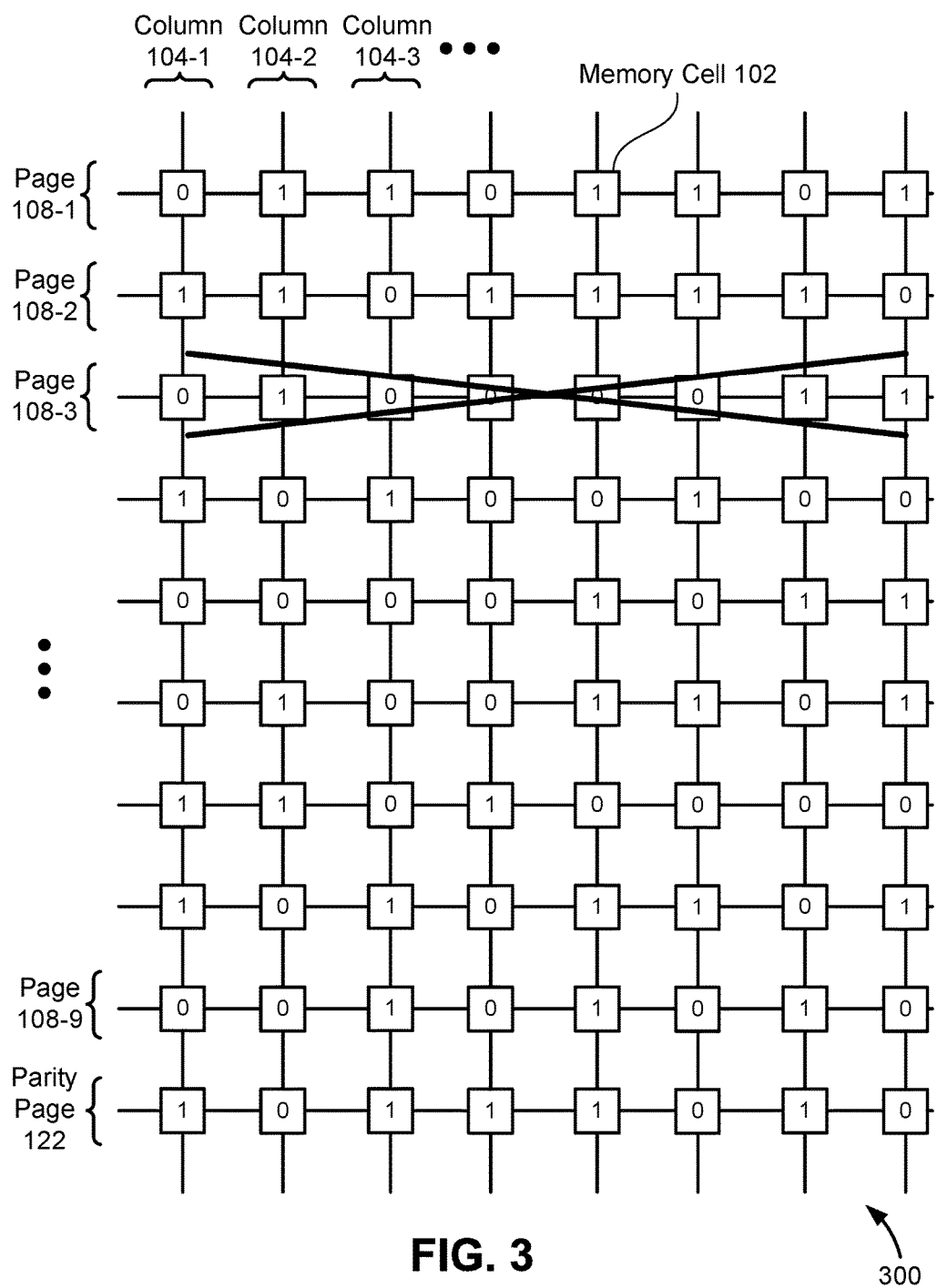
FIG. 3 shows a non-volatile memory containing a failed page, according to some embodiments of the present disclosure.

FIG. 3 shows a non-volatile memory 200 containing a failed page 108-3, according to some embodiments of the present disclosure. The data contained in failed page 108-3 may be unreadable and/or unwritable which may arise due to failures of one or more memory cells 102 within failed page 108-3 or due to the page failing as a whole. In some embodiments, non-volatile memory 200 includes a parity page 122 containing parity data dependent on pages 108 (specifically page 108-1 through 108-9) such that the parity data can be used to recover the data in a single failed page, e.g., failed page 108-3. For example, parity page 122 includes an odd parity bit for each of the eight memory cells within each of pages 108 such that the bits shown in failed page 108-3 are recoverable by performing 1 bit binary addition (or using an XOR operation) using the memory cells of the non-failed pages. For example, the 0 value of the memory cell shared by failed page 108-3 and column 104-1 is recovered by performing 1 bit binary addition using the memory cells shared by the non-failed pages and column 104-1 (0+1+1+0+0+1+1+0=0). The remaining bits corresponding to the memory cells of failed page 108-3 are recovered in a similar manner.

Figure 4:
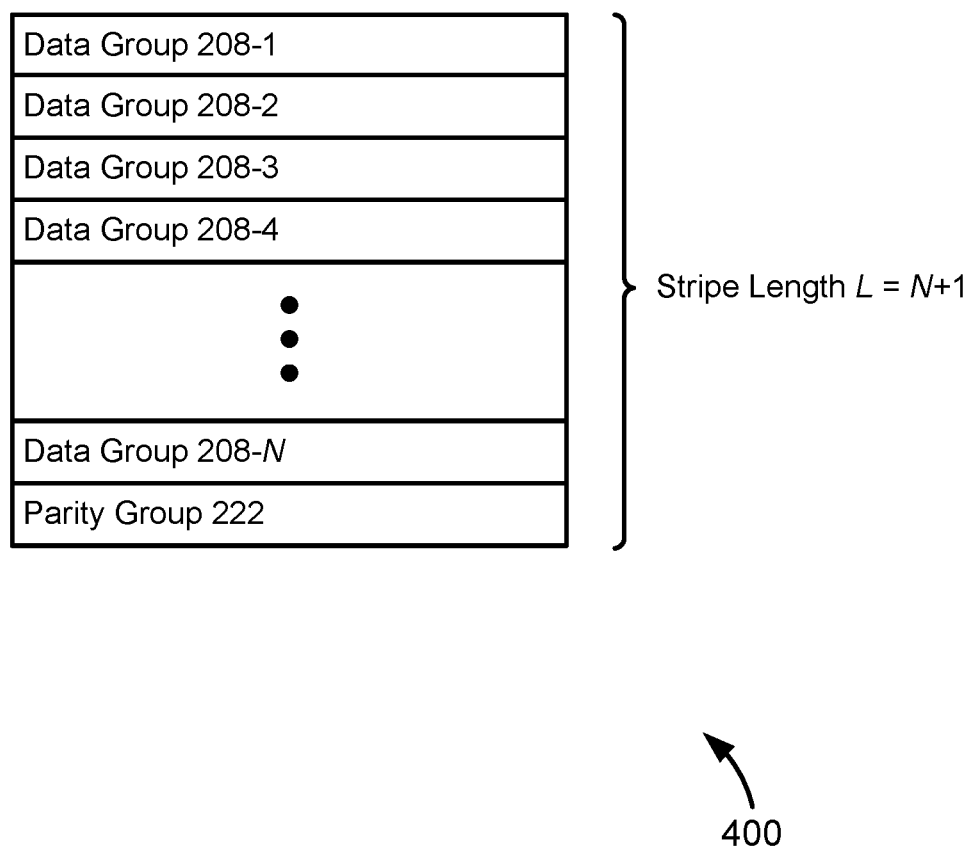
FIG. 4 shows a representation of a stripe containing various data groups, according to some embodiments of the present disclosure.

FIG. 4 shows a representation of a stripe 400 containing data groups 208 and a parity group 222, according to some embodiments of the present disclosure. Data groups 208 and parity group 222 may comprise chips, dies, planes, columns, bitlines, pages, blocks, wordlines, among others. Each of data groups 208 and parity group 222 may include an identical number of memory cells 102. For example, each of data groups 208 may include 8 memory cells and parity group 222 may include 8 memory cells, similar to the configuration of non-volatile memory 200. As another example, each of data groups 208 may include 32,000 memory cells and parity group 222 may include 32,000 memory cells. In some embodiments, each of data groups 208 and parity group 222 include different numbers of memory cells.

Stripe 400 includes N data groups that include non-parity data, referred to as data groups 208, and one data group that includes parity information, referred to as parity group 222. The size of stripe 400 is the total number of data groups including non-parity and parity data and is equal to N+1. The size of stripe 400 is referred to as stripe length L.

FIG. 5 shows a representation of a plurality of stripes 500, according to some embodiments of the present disclosure. Stripes 500 includes stripes $S_1$, $S_2$, $S_3$, and $S_4$ which each include one parity group P and at least one data group D. For example, stripe $S_1$ includes parity group $P_1$ and data groups $D_{1-1}$ through $D_{1-N_1}$ where $N_1$ is the number of data groups in $S_1$ that contain non-parity information. If $N_1$ is equal to 1, then stripe $S_1$ only includes parity group $P_1$ and data group $D_{1-1}$ and stripe length $L_1$ is equal to 2. Stripe lengths $L_1$, $L_2$, $L_3$, and $L_4$ are determined by controller 120 and may be dynamically updated and modified by controller 120. Operations/steps/tasks described in reference to FIG. 5 (and additionally FIGS. 6-9) may be performed by controller 120 by loading instructions stored in memory (not shown) coupled to controller 120 into controller 120 and executing the operations/steps/tasks.

In some embodiments, an individual BER is determined, calculated, measured, and/or estimated for each parity group P and data group D of stripes 500 by controller 120. In some embodiments, the individual BER of a data group may be the average number of bit errors associated with the memory cells of the data group per unit time. In other embodiments, the individual BER of a data group may be the average number of bit errors associated with the memory cells of the data group divided by the total number of transferred bits. Controller 120 may determine stripes $S_1$, $S_2$, $S_3$, and $S_4$ and stripe lengths $L_1$, $L_2$, $L_3$, and $L_4$ based on individual BERs and/or composite BERs for two or more data groups.

A composite BER of two or more data groups is determined by combining the respective individual BERs of the two or more data groups such that the composite BER is indicative of the average or aggregate number of bit errors associated with all of the memory cells of the two or more data groups. For example, a composite BER for stripe $S_1$ (i.e., $BER(S_1)$) may be determined by combining the individual BERs of the data groups within stripe $S_1$: $BER_{1-1}$, $BER_{1-2}$, ..., $BER_{1-N_1}$, and $BER_{P_1}$. In general, the composite BER is greater than or equal to the individual BERs from which it corresponds as the average number of bit errors increases as additional memory cells are included. In some embodiments, a summation of individual BERs may be performed to determine a composite BER (e.g., $BER(S_1) = BER_{1-1} + BER_{1-2} + BER_{1-3} + BER_{P_1} = 1\times10^{-6} + 3\times10^{-6} + 2\times10^{-6} + 2\times10^{-6} = 8\times10^{-6}$). In some embodiments, an average of individual BERs may be performed to determine a composite BER (e.g., $BER(S_1) = \frac{1}{4}\times BER_{1-1} + \frac{1}{4}\times BER_{1-2} + \frac{1}{4}\times BER_{1-3} + \frac{1}{4}\times BER_{P_1} = 0.25\times10^{-6} + 0.75\times10^{-6} + 0.5\times10^{-6} + 0.5\times10^{-6} = 2\times10^{-6}$). In embodiments in which data groups $D_{1-1}$ through $D_{1-N_1}$ include different numbers of memory cells, a composite BER may be determined by weighing each individual BER by the number of memory cells in each individual data group. Composite BERs may be determined, calculated, measured, and/or estimated by controller 120.

In some embodiments, stripes $S_1$, $S_2$, $S_3$, and $S_4$ and stripe lengths $L_1$, $L_2$, $L_3$, and $L_4$ are determined by controller 120 such that each of stripes $S_1$, $S_2$, $S_3$, and $S_4$ has a composite BER below a threshold. In other embodiments, stripes $S_1$, $S_2$, $S_3$, and $S_4$ and stripe lengths $L_1$, $L_2$, $L_3$, and $L_4$ are determined by controller 120 such that each of stripes $S_1$, $S_2$, $S_3$, and $S_4$ has a composite BER within a threshold distance of each other. For example, $L_1$, $L_2$, $L_3$, and $L_4$ may be determined such that the difference between $BER(S_1)$ and $BER(S_2)$, $BER(S_2)$ and $BER(S_3)$, $BER(S_3)$ and $BER(S_4)$, $BER(S_1)$ and $BER(S_3)$, $BER(S_2)$ and $BER(S_4)$, and $BER(S_1)$ and $BER(S_4)$ are each less than a threshold. In some instances, it is desirable to minimize BER variation between different stripes to reduce the overall LIBER of memory 140.

Figure 6:
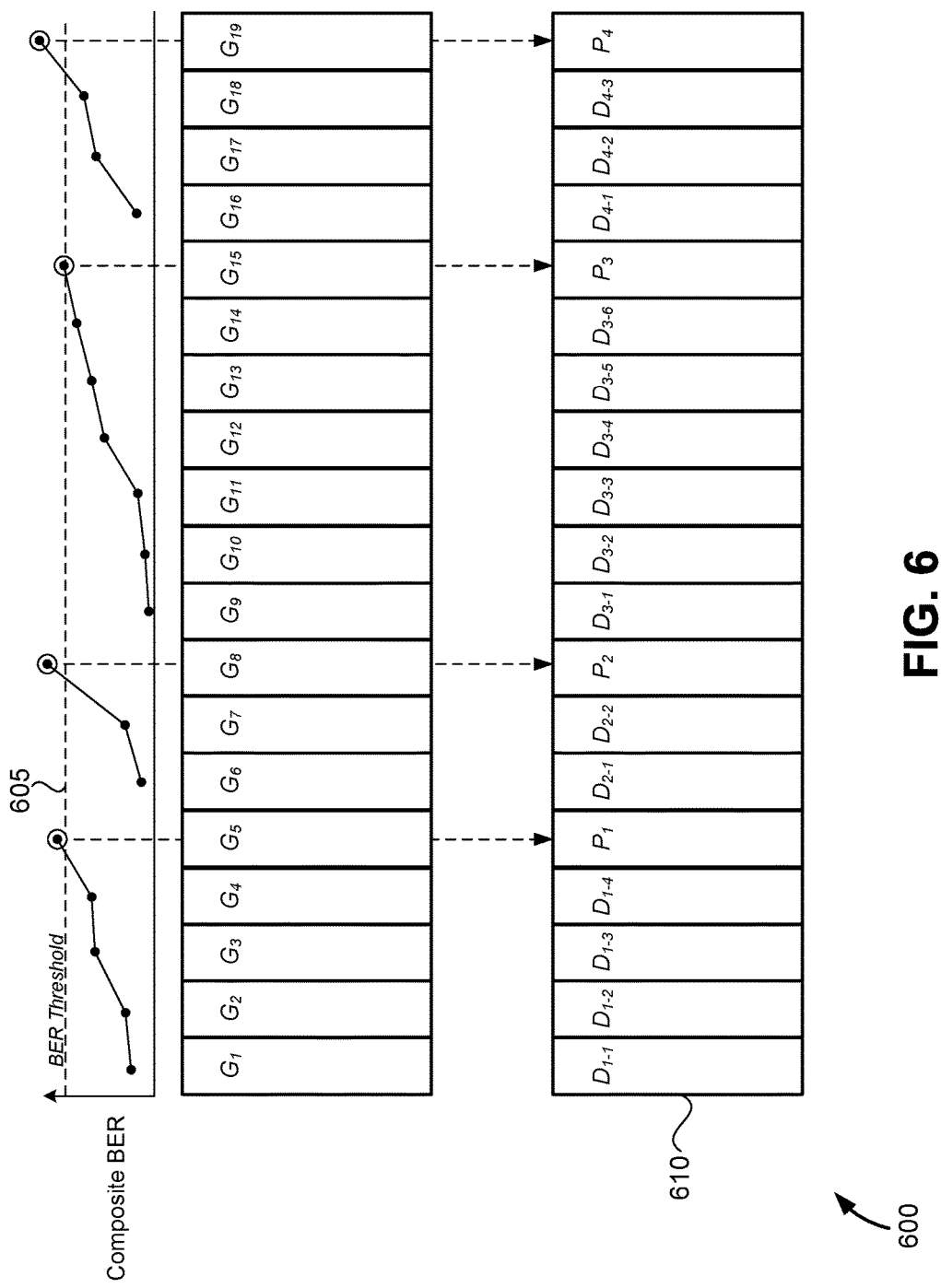
FIG. 6 shows a representation of a process for organizing data as a plurality of stripes, according to some embodiments of the present disclosure.

FIG. 6. shows a representation of a process 600 for organizing data as a plurality of stripes 610, according to some embodiments of the present disclosure. As a first step, various groups of memory cells $G_1$ through $G_{19}$ are identified. Groups $G_1$ through $G_{19}$ may have similar characteristics as those of data groups 208 (i.e., data groups D) as described herein. As a second step, a composite BER is determined for the combination of groups $G_1$ and $G_2$, and the determined composite BER is then compared to a BER threshold 605. If the composite BER for groups $G_1$ and $G_2$ exceeds BER threshold 605, then group $G_2$ is designated, organized, and/or labeled as parity group $P_1$ and group $G_1$ is designated, organized, and/or labeled as data group $D_{1-1}$. If the composite BER for groups $G_1$ and $G_2$ does not exceed BER threshold 605, then a composite BER is determined for the combination of groups $G_1$, $G_2$, and $G_3$. If the composite BER for groups $G_1$, $G_2$, and $G_3$ exceeds BER threshold 605, then group $G_3$ is designated as parity group $P_1$ and groups $G_1$ and $G_2$ are designated as data groups $D_{1-1}$ and $D_{1-2}$, respectively. If the composite BER for groups $G_1$, $G_2$, and $G_3$ does not exceed BER threshold 605, then a composite BER is determined for the combination of groups $G_1$, $G_2$, $G_3$, and $G_4$, repeating this sequence until a composite BER exceeds BER threshold 605.

In the specific embodiment shown in FIG. 6, a composite BER for the combination of groups $G_1$, $G_2$, $G_3$, $G_4$, and $G_5$ is determined to exceed BER threshold 605 and therefore $G_5$ is designated as parity group $P_1$ and groups $G_1$, $G_2$, $G_3$, and $G_4$ are designated as data groups $D_{1-1}$, $D_{1-2}$, $D_{1-3}$, and $D_{1-4}$, respectively, forming a first stripe $S_1$. The second step is then repeated starting with groups $G_6$ and $G_7$. In the specific embodiment in FIG. 6, a composite BER for the combination of groups $G_6$, $G_7$, and $G_8$ is determined to exceed BER threshold 605 and therefore $G_8$ is designated as parity group $P_2$ and groups $G_6$ and $G_7$ are designated as data groups $D_{2-1}$ and $D_{2-2}$, respectively, forming second stripe $S_2$.

In some embodiments of process 600, individual BERs for groups $G_1$ through $G_{19}$ need not be calculated. Although composite BERs are shown in FIG. 6 for some single groups (e.g., $G_1$, $G_6$, $G_9$, and $G_{16}$) which may be equivalent to an individual BER calculation, these composite/individual BERs need not be calculated to perform process 600, as demonstrated in the described steps. Furthermore, in some embodiments, a final composite BER may be calculated involving a final group (e.g., $G_{19}$) that doesn't exceed BER threshold 605. In such instances, either the final group may be designated as a parity group or, if designating the final group as a parity group would result in a stripe length less than two, the final group may instead be designated as a data group.

Figure 7:
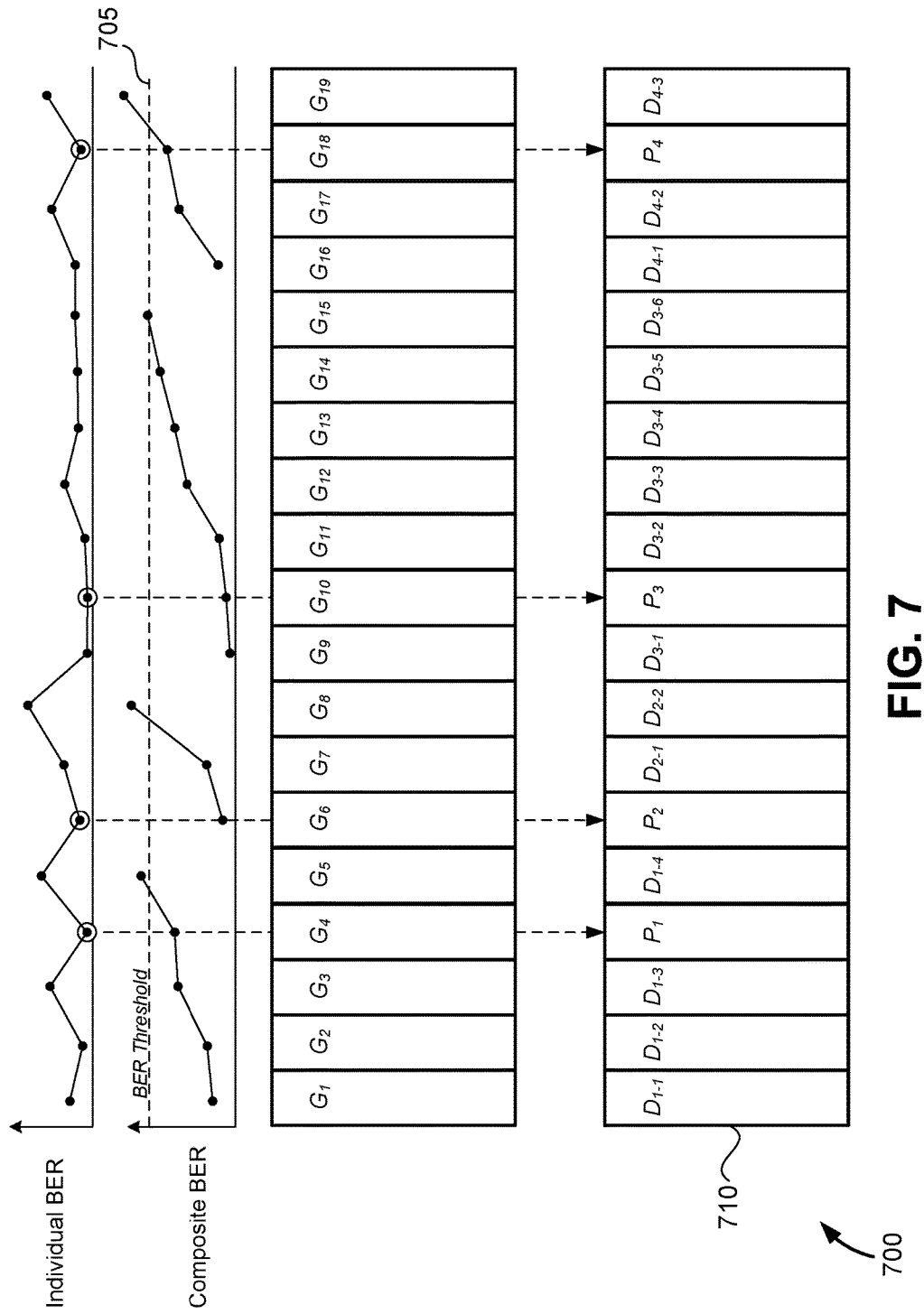
FIG. 7 shows a representation of a process for organizing data as a plurality of stripes, according to some embodiments of the present disclosure.

FIG. 7. shows a representation of a process 700 for organizing data as a plurality of stripes 710, according to some embodiments of the present disclosure. In some embodiments, process 700 may improve the UBER of memory system 140 over process 600. Process 700 differs from process 600 by additionally determining individual BERs for groups $G_1$ through $G_{19}$ and designating the group having the lowest BER as the parity group for a given stripe (or, in other embodiments, the group having the highest BER).

For example, as a first step, various groups of memory cells $G_1$ through $G_{19}$ are identified. As a second step, a composite BER is determined for the combination of groups $G_1$ and $G_2$, and the determined composite BER is then compared to a BER threshold 705. If the composite BER for groups $G_1$ and $G_2$ does not exceed BER threshold 705, then a composite BER is determined for the combination of groups $G_1$, $G_2$, and $G_3$, proceeding until a composite BER exceeds BER threshold 705. Once a composite BER exceeds BER threshold 705, then as a third step, individual BERs are determined for each of the groups from which the composite BER was determined. As a fourth step, a minimum individual BER is identified and the corresponding group is designated as the parity group, the minimum individual BER being the lowest individual BER of the individual BERs for each of the groups involved in the composite BER that exceeded BER threshold 705. For example, if the composite BER for groups $G_1$, $G_2$, and $G_3$ exceeds BER threshold 705, then individual BERs are determined for each of groups $G_1$, $G_2$, and $G_3$. The minimum individual BER is then identified and the corresponding group is designated as parity group $P_1$ and the other two groups (each not corresponding to the minimum individual BER) are designated as data group $D_{1-1}$ and $D_{1-2}$.

In the specific embodiment shown in FIG. 7, a composite BER for the combination of groups $G_1$, $G_2$, $G_3$, $G_4$, and $G_5$ is determined to exceed BER threshold 705 and individual BERs are determined for each of groups $G_1$, $G_2$, $G_3$, $G_4$, and $G_5$. A minimum individual BER corresponding to group $G_4$ is identified, as shown in FIG. 7. $G_4$ is then designated as parity group $P_1$ and groups $G_1$, $G_2$, $G_3$, and $G_5$ are designated as data groups $D_{1-1}$, $D_{1-2}$, $D_{1-3}$, and $D_{1-4}$, respectively, forming a first stripe $S_1$. The second, third, and fourth steps are then repeated starting with groups $G_6$ and $G_7$ and proceeding until group $G_{19}$.

Figure 8:
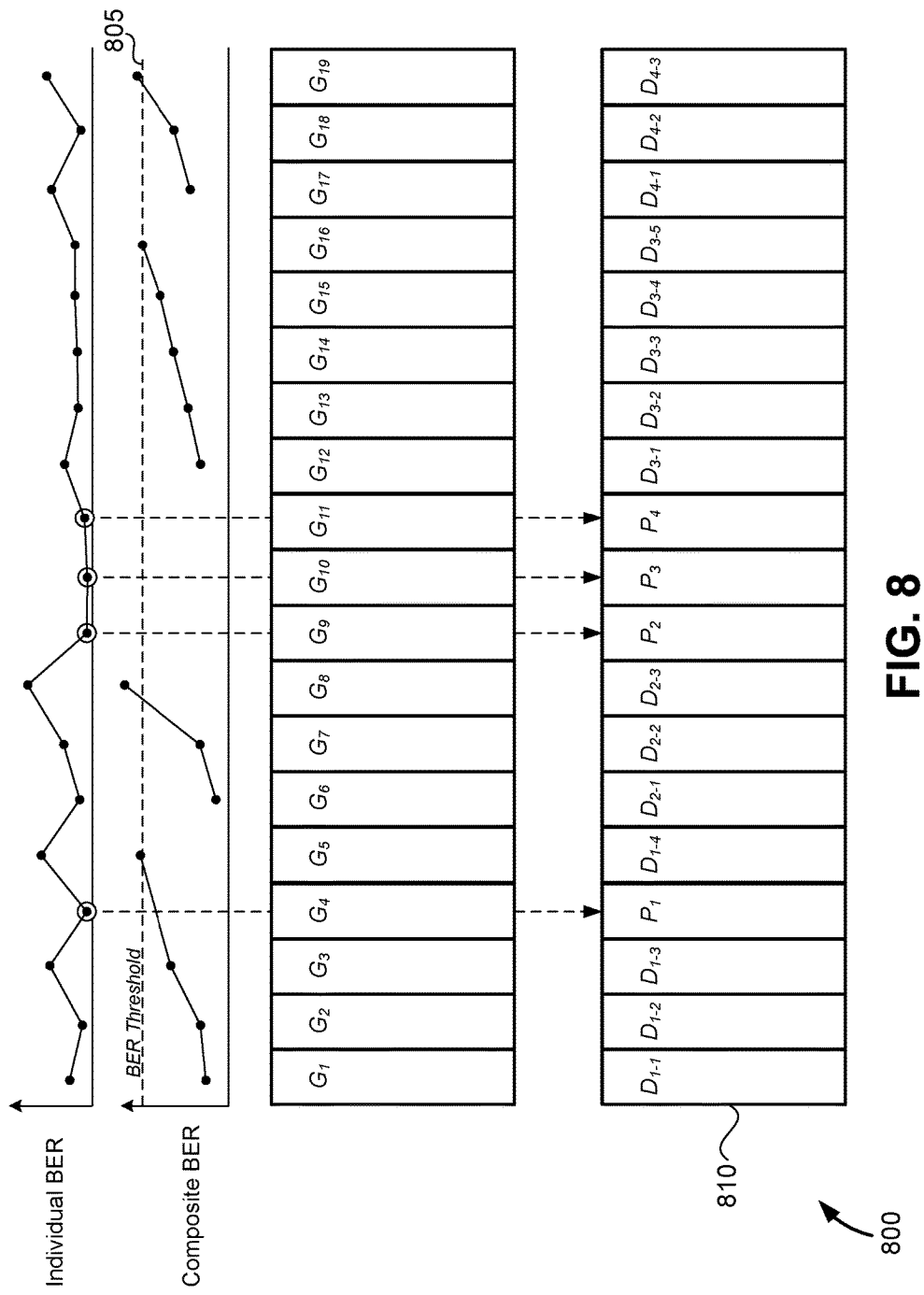
FIG. 8 shows a representation of a process for organizing data as a plurality of stripes, according to some embodiments of the present disclosure.

FIG. 8. shows a representation of a process 800 for organizing data as a plurality of stripes 810, according to some embodiments of the present disclosure. In some embodiments, process 800 may improve the UBER of memory system 140 over processes 600 and 700, and may be performed subsequent to performance of process 600 and/or 700 to improve the UBER. As a first step, various groups of memory cells $G_1$ through $G_{19}$ are identified. As a second step, individual BERs are determined for each of the groups $G_1$ through $G_{19}$. As a third step, the individual BERs are ordered from lowest to highest, and a number of the lowest individual BERs are identified. When process 800 is performed after processes 600 and/or 700, the number of the lowest individual BERs that are identified may be the number of stripes obtained through processes 600 and/or 700 (e.g., four).

As a fourth step, a composite BER is determined for the combination of the first two groups of groups $G_1$ through $G_{19}$ that do not correspond to one of the identified lowest individual BERs (e.g., $G_1$ and $G_2$) and the determined composite BER is then compared to a BER threshold 805. If the composite BER for groups $G_1$ and $G_2$ exceeds BER threshold 805, then one of the groups corresponding to one of the identified lowest individual BERs is designated as parity group $P_1$ and groups $G_1$ and $G_2$ are designated as data groups $D_{1-1}$ and $D_{1-2}$, respectively. If the composite BER for groups $G_1$ and $G_2$ does not exceed BER threshold 805, then a composite BER is determined for the combination of groups $G_1$, $G_2$, and the next group of groups $G_1$ through $G_{19}$ that does not correspond to one of the identified lowest individual BERs (e.g., $G_3$). If the composite BER for groups $G_1$, $G_2$, and $G_3$ exceeds BER threshold 805, then one of the groups corresponding to one of the identified lowest individual BERs is designated as parity group $P_1$ and groups $G_1$, $G_2$, and $G_3$ are designated as data groups $D_{1-1}$, $D_{1-2}$, and $D_{1-3}$, respectively.

In the specific embodiment shown in FIG. 8, the four lowest individual BERs correspond to groups $G_4$, $G_9$, $G_{10}$, and $G_{11}$. Composite BERs are then determined similar to processes 600 and 700 except the groups corresponding to the lowest individual BERs are ignored. A composite BER for the combination of groups $G_1$, $G_2$, $G_3$, and $G_5$ is determined to exceed BER threshold 805. $G_4$ is then designated as parity group $P_1$ and groups $G_1$, $G_2$, $G_3$, and $G_5$ are designated as data groups $D_{1-1}$, $D_{1-2}$, $D_{1-3}$, and $D_{1-4}$, respectively, forming a first stripe $S_1$. The second, third, and fourth steps are then repeated starting with groups $G_6$ and $G_7$ and proceeding until group $G_{19}$. In some embodiments, BER threshold 805 is less than BER thresholds 605 and 705. In some instances, BER threshold 805 is determined by subtracting the average individual BER of the identified lowest individual BERs from thresholds 605 or 705.

Figure 9:
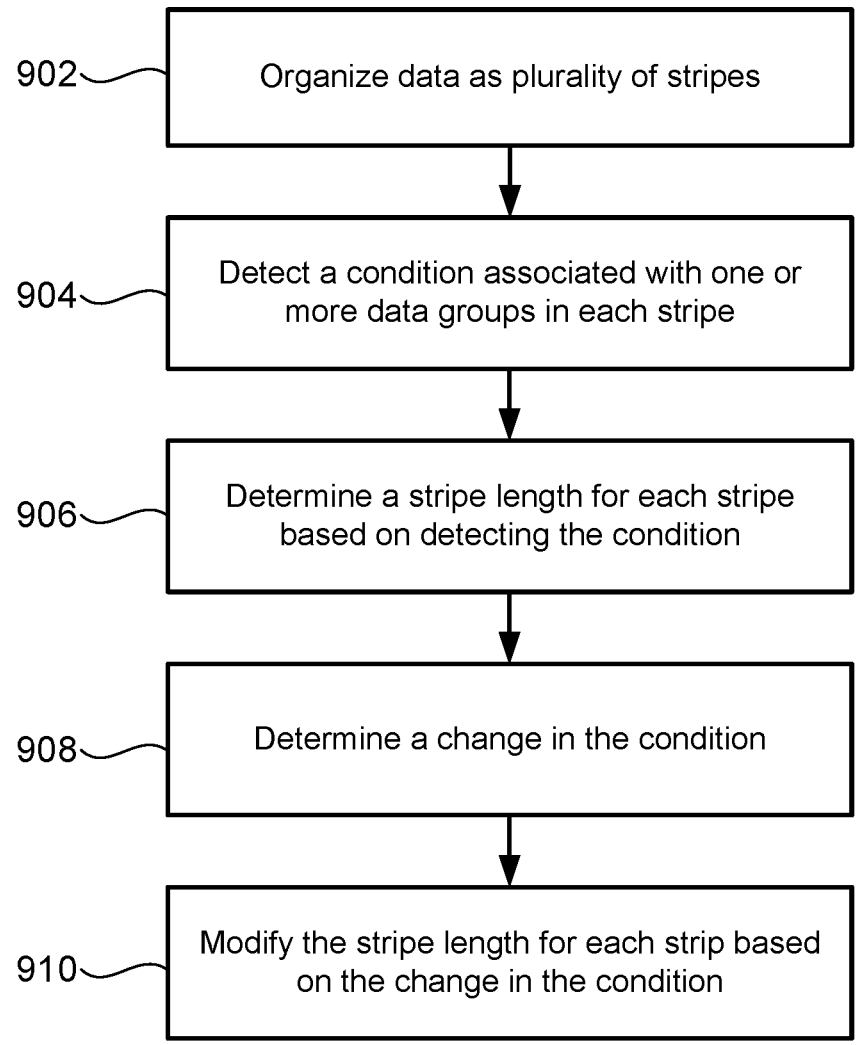
FIG. 9 shows a representation of a process for storing data in a memory comprising a plurality of memory cells, according to some embodiments of the present disclosure.

FIG. 9. shows a representation of a process 900 for storing data in a memory comprising a plurality of memory cells, according to some embodiments of the present disclosure. At step 902 the data is organized as a plurality of stripes. Steps of process 900 may be performed by controller 120 and may be performed in any order. For example, controller 120 may organize the data as a plurality of stripes after determining the stripe lengths of the plurality of stripes. As another example, in some embodiments, controller 120 may organize the data may as a plurality of stripes in response to detecting a condition associated with one or more data groups or in response to finishing a step of determining/calculating of the stripe lengths. As described herein, each individual stripe of the plurality of stripes includes a plurality of data groups. The plurality of data groups may include both data groups D and parity groups P as described herein. The plurality of data groups may be stored in the memory using a subset of the plurality of memory cells such that each different data group is stored in a different non-overlapping subset of memory cells. In some embodiments, step 902 is performed after steps 904 and 906.

At step 904, a condition associated with one or more data groups of the plurality of data groups is detected. The condition may be an individual BER, a composite BER, a voltage noise level, a temperature, and/or any performance metric associated with the one or more data groups. The condition may include a single condition or multiple conditions. For example, the condition may be a single individual BER for a single data group, multiple individual BERs for multiple data groups in a single stripe, or multiple individual BERs for multiple data groups in multiple stripes, among other possibilities. The condition may be a voltage noise level associated with one or more floating gate transistors of one or more memory cells 102. For example, a high voltage noise level increases the likelihood of a bit error occurring, which may influence the stripe length (higher voltage noise level corresponding to shorter stripe length). As another example, the condition may be the temperature of non-volatile memory 130, which may be measured and used to model transistor behavior. In some instances, a relationship between temperature and stripe length may be determined such that stripe length is an increasing function of temperature.

In some embodiments, the condition may be related to flash memory technology type, such as single-level cell (SLC), multi-level cell (MLC), and triple-level cell (TLC). For example, for TLC flash memory, the condition may be whether a particular data group is part of a least-significant bit (LSB) page, a center-significant bit (CSB) page, or a most-significant bit (MSB) page. In some instances, MSB pages might have a much larger BER than LSB and CSB pages, and if the same stripe length is applied to MSB pages as is applied to LSB and CSB pages then the LIBER of memory system 140 will be higher than would be otherwise if the stripe length for MSB pages were shorter than the stripe lengths for LSB and CSB pages. Therefore, in some embodiments, the condition is whether the one or more data groups of the plurality of data groups are part of LSB, CSB, or MSB pages, and the determined stripe length, based on this condition, is a first stripe length if the one or more data groups are part of LSB pages, a second stripe length if the one or more data groups are part of CSB pages, and a third stripe length if the one or more data groups are part of MSB pages, where the first stripe length is longer than the second stripe length and the second stripe length is longer than the third stripe length (and consequently, the first stripe length is longer than the third stripe length). In some embodiments, the stripe lengths for LSB, CSB, and MSB pages are determined such that the BERs of LSB, CSB, and MSB pages are equalized. In some instances, if a lower BER for LSB and CSB pages is preferred, the stripe length of only MSB pages need be increased.

In some embodiments, the condition may be related to wordline, as different wordlines in a die might have large BER variation. For example, different wordlines may be divided into different groups based on their BER. For a first group having a range of low BERs, a long stripe length can be used. For a second group having a range of high BERs, a short stripe length can be used. In some embodiments, different wordlines have different defect probabilities, which may be used to determine/calculate stripe length. In 3D NAND, upper wordlines have higher dimension and have a higher chance of shorting. The condition may be whether a particular data group is part of an upper/top wordline, and the stripe length may be decreased when that is the case.

At step 906, a stripe length for each individual stripe of the plurality of stripes is determined based on detecting the condition associated with the one or more data groups, the stripe length being the number or quantity of data groups in each individual stripe. Step 906 may be performed by controller 120, and may include determining the number of different stripes and/or determining the content (e.g., which data groups) of the stripes. In some embodiments, each stripe includes exactly one data group that comprises parity data for correcting bit errors associated with the specific memory cells that are included in the data groups of the particular stripe. As described herein, the specific data group that comprises parity data may be selected such that the data group having the lowest individual BER is selected. In other embodiments, the data group having the highest individual BER may be selected for each stripe. In some embodiments, each stripe may include multiple data groups that comprise parity data for correcting bit errors.

At step 908, a change in the condition is determined. The change in the condition may include a change in one or more individual BERs, one or more composite BERs, among other possibilities. The change in the condition may occur when the condition changes by an amount more than a predetermined threshold. For example, the condition may be determined to change when the BER changes by more than 10% of its previous amount. In some embodiments, the condition may be determined at set time intervals such that controller 120 determines whether there has been a change in the condition periodically at set times. At step 910, a stripe length for at least one individual stripe is modified based on the change in the condition. The modification may be a change in the number or quantity of data groups in each individual stripe. In some embodiments, the modification may be a switch of which data group is selected as comprising parity data or a switch of data groups between different stripes, among other possibilities.

What is claimed is:

1. A memory device comprising:
   a memory comprising a plurality of memory cells for storing data; and
   a controller communicatively coupled to the memory and configured to organize the data as a plurality of stripes, wherein each individual stripe of the plurality of stripes comprises:
   a plurality of data groups, each of the plurality of data groups stored in the memory using a subset of the plurality of memory cells, wherein:
   a stripe length for the individual stripe is determined by the controller based on detecting a condition associated with one or more data groups of the plurality of data groups, and
   the stripe length for the individual stripe is a number of the plurality of data groups included in the individual stripe; and
   at least one data group of the plurality of data groups for each of the individual stripes comprising parity data for correcting bit errors associated with the subset of the plurality of memory cells for the individual stripe.

2. The memory device of claim 1, wherein the controller is further configured to:
   determine a change in the condition; and
   modify the stripe length for the individual stripe based on the change in the condition.

3. The memory device of claim 1, wherein a first stripe of the plurality of stripes has a first stripe length and a second stripe of the plurality of stripes has a second stripe length wherein the first stripe length and the second stripe length are different.

4. The memory device of claim 1, wherein the condition is a first condition and wherein the memory device is further configured to determine the stripe length for the individual stripe based on a second condition.

5. The memory device of claim 1, wherein the condition is a first condition and wherein the memory device is further configured to modify the stripe length for the individual stripe based on a second condition.

6. The memory device of claim 1, wherein the condition is a bit error rate (BER) for the one or more data groups of the individual stripe.

7. The memory device of claim 6, wherein the stripe length for the individual stripe is determined such that the BER for the one or more data groups of the individual group is less than a threshold.

8. The memory device of claim 6, wherein a plurality of BERs is determined comprising the BER for the one or more data groups of each of the plurality of stripes, and wherein the stripe length for each of the plurality of stripes is determined such that each of the plurality of BERs are within a threshold distance of each other.

9. The memory device of claim 6, wherein the controller is further configured to:
   determine the BER for the one or more data groups of the individual stripe.

10. The memory device of claim 1, wherein the condition is a placement of the memory cells associated with the one or more data groups of the individual stripe within the memory.

11. The memory device of claim 1, wherein the condition is a number of program erase cycles (PEC) for the one or more data groups of the individual stripe.

12. A method for storing data in a memory comprising a plurality of memory cells, the method comprising:
   organizing the data as a plurality of stripes, wherein each individual stripe of the plurality of stripes comprises a plurality of data groups, each of the plurality of data groups stored in the memory using a subset of the plurality of memory cells;

detecting a condition associated with one or more data groups of the plurality of data groups; and determining a stripe length for the individual stripe based on detecting the condition, wherein the stripe length is a number of the plurality of data groups included in the individual stripe;

wherein at least one data group of the plurality of data groups for each of the individual stripes comprises parity data for correcting bit errors associated with the subset of the plurality of memory cells for the individual stripe.

13. The method of claim 12, further comprising:
determining a change in the condition; and
modifying the stripe length for the individual stripe based on the change in the condition.

14. The method of claim 12, wherein a first stripe of the plurality of stripes has a first stripe length and a second stripe of the plurality of stripes has a second stripe length wherein the first stripe length and the second stripe length are different.

15. The method of claim 12, wherein the condition is a first condition and wherein the method further comprises:
detecting a second condition associated with the one or more data groups of the plurality of data groups; and
modifying the stripe length for the individual stripe based on detecting the second condition.

16. The method of claim 12, wherein the condition is a bit error rate (BER) for the one or more data groups of the individual stripe.

17. The method of claim 16, wherein the stripe length for the individual stripe is determined such that the BER for the one or more data groups of the individual group is less than a threshold.

18. A controller communicatively coupled to a memory comprising a plurality of memory cells for storing data, the controller configured to perform operations comprising:

organizing the data as a plurality of stripes, wherein each individual stripe of the plurality of stripes comprises a plurality of data groups, each of the plurality of data groups stored in the memory using a subset of the plurality of memory cells;

detecting a condition associated with one or more data groups of the plurality of data groups; and determining a stripe length for the individual stripe based on detecting the condition, wherein the stripe length is a number of the plurality of data groups included in the individual stripe;

wherein at least one data group of the plurality of data groups for each of the individual stripes comprises parity data for correcting bit errors associated with the subset of the plurality of memory cells for the individual stripe.

19. The controller of claim 18, the operations further comprising:
determining a change in the condition; and
modifying the stripe length for the individual stripe based on the change in the condition.

20. The controller of claim 18, wherein the condition is a bit error rate (BER) for the one or more data groups of the individual stripe.

* * * * *